(No Model.)

J. A. MURRAY.
FRUIT HULLER.

No. 528,257. Patented Oct. 30, 1894.

WITNESSES
J. M. Hartnett.
E. A. Woodbury.

INVENTOR
John A. Murray,
By his Atty
Henry W. Williams

UNITED STATES PATENT OFFICE.

JOHN A. MURRAY, OF WINCHESTER, MASSACHUSETTS.

FRUIT-HULLER.

SPECIFICATION forming part of Letters Patent No. 528,257, dated October 30, 1894.

Application filed June 16, 1894. Serial No. 514,786. (No model.)

*To all whom it may concern:*

Be it known that I, JOHN A. MURRAY, a citizen of the United States, residing at Winchester, in the county of Middlesex and State of Massachusetts, have invented a new and useful Improvement in Fruit-Hullers, of which the following is a specification.

This is a device for hulling fruit or berries, and is an improvement over and upon the fruit huller described and illustrated in Letters Patent of the United States granted June 18, 1878, to Augustus S. Bunker, and numbered 205,049. It has been found in practice, that a device constructed according to the terms of the said Letters Patent possesses the disadvantage of frequently causing a portion of the berry being hulled to stick to one or both of the bowls of the huller, so that the inner or concave faces thereof are often clogged or filled, especially when a soft berry is operated upon, such substance hardening and adhering to the bowls with great tenacity and necessitating frequent cleanings.

It is the object of this invention to obviate this difficulty.

The nature of the improvement is fully described below, and illustrated in the accompanying drawings, in which—

Figure 1:
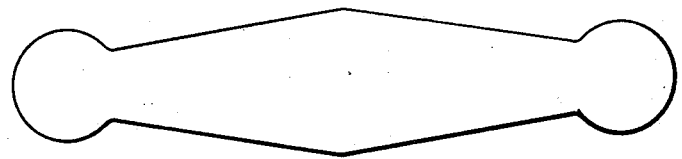
Figure 2:
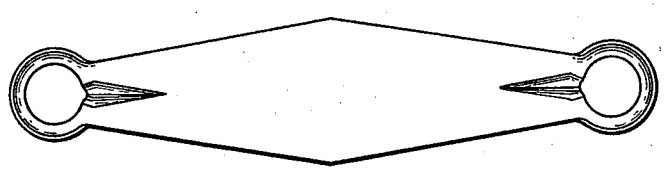
Figure 3:
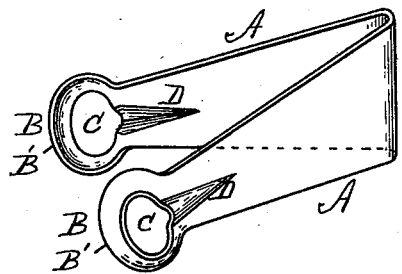
Figure 4:
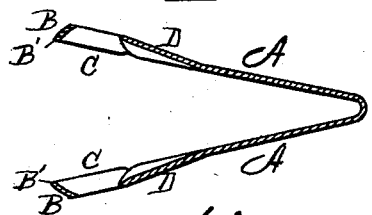

Figure 1 represents the blank from which my improved device is struck up. Fig. 2 shows the device constructed from the blank before it is bent into shape. Fig. 3 is a perspective view of the completed article. Fig. 4 is a longitudinal section of the same.
Similar letters of reference indicate corresponding parts.

The device consists of a piece of metal bent into the two handles A, shown in Figs. 3 and 4, springing normally somewhat apart. The ends of these handles, instead of being cup-shaped, or concavo-convex, as in the invention described in the Letters Patent above referred to, are made ring-shaped, *i. e.*, each handle terminates at its free end in a ring B. The metal composing the ring is not flat or on a line with the handle, but is formed up into the inwardly flaring shape shown. When the hull is pinched by the edges B' of the rings, in order to remove it from the berry, any portion of the berry, which, through softness or inaccuracy of grasp, comes in contact with or is caught by the device, will not adhere thereto, but will fall through one of the holes C produced by the ring.

It is apparent that what cleansing is needful is very quickly done, as there are no bowls to be dug out.

Ordinary ribs D are formed for strengthening purposes.

In manufacturing the device, the blank shown in Fig. 1 is first produced, then the holes C cut out and the rings B formed up into inwardly flaring shape as shown in Fig. 2; then the bend produced at the center, forming the completed product shown in Figs. 3 and 4.

Having thus fully described my invention, what I claim, and desire to secure by Letters Patent, is—

The herein-described improved fruit or berry huller, consisting of the handles A terminating at their free or outer ends in the inwardly flaring rings B, substantially as set forth.

JOHN A. MURRAY.

Witnesses:
HENRY W. WILLIAMS,
J. M. HARTNETT.